Patented Jan. 3, 1939

2,142,327

UNITED STATES PATENT OFFICE 2,142,327

TREATMENT OF LUBRICATING STOCKS

John M. Musselman, Cleveland, Ohio, assignor to The Standard Oil Company, Cleveland, Ohio, a corporation of Ohio No Drawing. Application January 29, 1936, Serial No. 61,429

10 Claims. (Cl. 87—9)

It was suggested long ago to add rubber to lubricating oil in an effort to raise the viscosity. Such process has never come to commercial proportions, a reason being that degenerative changes soon occur in the usage of such oil, and it becomes of no value. In accordance with the present invention however, it is now possible to treat lubricating stocks such as to attain the primary viscosity-raise offered by such material as rubber, and also attain a stable product capable of standing up under drastic usage without the degenerative changes customarily associated with rubber-compounded material.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

An oil stock, in accordance with the invention, is treated by incorporation of rubber in small amount, for instance 0.5–5 per cent, and the mixture is subjected to heat, steam and the action of a contact agent. The order of action by these respectively may vary, and the steam or the contact agent may be employed as preferred first, but in general the simultaneous operation is advantageous. As contact agent, activated filter clay, fuller's earth, or adsorbent may be employed. A desirable form of rubber is crude crepe or analogous convenient form, brought into suitable condition for incorporation into the oil, as by fine division or by solution in a small amount of solvent, such as benzol, etc. With the rubber disseminated in the oil, the contact agent, as clay, is mixed in in small amount, as 1 to 3 per cent, and the mixture is thoroughly stirred until the contact agent is dispersed. Heat is applied, and this may be primarily by external heating and then by steam, or steam can be relied upon for the entire heating necessary. If steam is relied upon wholly, it is desirable to employ superheated steam at least in part, and the temperature of oil treatment should be such as to reach a point above the flash-point of the oil, for instance 75–100° F. above the flash-point. After super-heated steam, boiling steam or saturated steam may be employed, and in all cases the steam is injected directly into the oil so as to thoroughly disseminate therewith and condense.

As an example: A Pennsylvania lubricating stock having a viscosity at 100° F. of 200 Saybolt Universal, viscosity at 210° F. of 47, viscosity index 100, color 4, and steam emulsion Number 60, is treated by the incorporation of 1 per cent of rubber. Contact agent, as activated clay, in amount of 2 per cent is incorporated and thoroughly stirred. The temperature reaches about 285° F. Super-heated steam at a temperature of 500° F. is passed in at the rate to form one-half pound water condensate per gallon of oil, and the temperature is raised to about 400° F. The super-heated steam is now replaced by saturated steam, again at the rate of one-half pound of condensate per gallon of oil, and the saturated steam lowers the temperature to about 350° F., and the steam is shut off, and the oil is filtered to remove the clay. The oil has a viscosity at 100° F. of 225 Saybolt Universal viscosity at 210° F. of 51, viscosity index 126, color 4, and S. E. 15.

As a further illustration of the behavior of oil in accordance with the present invention, operating data may be noted. A lubricating oil of Midcontinent source was employed, having the following characteristics: Gravity 24.5, S. U. viscosity at 100° F. 347, S. U. viscosity at 210° F. 52.5, viscosity index 70, flash 430. A portion of this oil was made up in accordance with the invention, by incorporating 1 per cent of pale crepe rubber and heating and steaming to 400° F. for 4 hours, in contact with 2 per cent of Utah clay. The small amount of benzol employed as vehicle initially for the rubber was distilled off, and the clay filtered out. The untreated oil and the oil thus treated were then employed in comparative runs in a test engine, a Series 30 Ethyl Gasoline Corporation test motor, and with a steam refined lead-free gasoline of low end point to minimize crankcase dilution. Te engine was operated at 600 R. P. M. for 25 hours in each case, with head temperature 600° F., jacket temperature 300° F., fuel setting 20 per cent, and volume of oil the same in both instances. After the runs, the respective oils taken from the engine tested as follows:

| | Untreated oil | Oil treated with 1 per cent rubber |
|---|---|---|
| Gravity | 24.5 | 24.5 |
| Viscosity at 100 | 390 | 445 |
| Viscosity at 200 | 54 | 60 |
| Viscosity index | 75 | 95 |
| Flash | 400 | 400 |
| Asphaltene | 9.2 mg. | 3.8 mg. |
| Engine carbon | 14.8 mg. | 8.2 mg. |
| Carbon in rings | 0.50 G | 0.40 G |
| Oil consumption | 225 cc. | 175 cc. |
| Ash content | 4.0 mg. | 2.0 mg. |

The comparative condition of the oils shows that oil treated in accordance with the invention lowers the oil consumption, and reduces the asphaltene. The lower ash content and lower carbon deposition in the rings, also the lower engine carbon, show the improved lubrication attainable.

Other modes of applying the principle of the invention may be employed, change being made as regards the details described, provided the features stated in any of the following claims, or the equivalent of such, be employed.

I therefore particularly point out and distinctly claim as my invention:—

1. A process of treating oil for lubricating use, which comprises incorporating a small amount of rubber in the oil, and injecting steam directly in the oil and heating to the temperature of super-heated steam.

2. A process of treating oil for lubricating use, which comprises incorporating a small amount of rubber in the oil, and subjecting the oil to the action of a contact agent and direct steam, and heating to the temperature of superheated steam and separating the contact agent.

3. A process of treating oil for lubricating use, which comprises incorporating a small amount of rubber in the oil, stirring into the oil a small amount of a contact agent, and heating to the temperature of superheated steam and injecting steam into the oil, and separating the contact agent.

4. A process of treating oil for lubricating use, which comprises incorporating a small amount of rubber in the oil, and subjecting the oil to the direct action of super-heated steam.

5. A process of treating oil for lubricating use, which comprises incorporating a small amount of rubber in the oil, and subjecting the oil to the direct action of super-heated steam and a contact agent.

6. A process of treating oil for lubricating use, which comprises incorporating a small amount of rubber in the oil, and subjecting the oil to the direct action of super-heated steam and saturated steam, and a contact agent.

7. A process of treating oil for lubricating use, which comprises incorporating a small amount of rubber in the oil, admixing a contact agent, and injecting super-heated steam.

8. A process of treating oil for lubricating use, which comprises incorporating a small amount of rubber in the oil, admixing a contact agent, injecting super-heated steam and raising the temperature above the flash-point of the oil, and separating the contact agent.

9. A process of treating oil for lubricating use, which comprises incorporating a small amount of rubber in the oil, admixing a contact agent, injecting super-heated steam and raising the temperature to above the flash-point of the oil, injecting saturated steam, and filtering off the contact agent.

10. A process of treating oil for lubricating use, which comprises incorporating a small amount of rubber in the oil, admixing activated clay, heating and injecting super-heated steam to about one-half pound of condensate per gallon of oil, injecting saturated steam to about one-half pound condensate per gallon of oil and lowering the temperature, and filtering off the contact agent.

JOHN M. MUSSELMAN.